US011606510B2

(12) United States Patent
Wang et al.

(10) Patent No.: US 11,606,510 B2
(45) Date of Patent: Mar. 14, 2023

(54) INTELLIGENT MULTI-CAMERA SWITCHING WITH MACHINE LEARNING

(71) Applicant: Plantronics, Inc., Santa Cruz, CA (US)

(72) Inventors: Jian David Wang, Burnaby (CA); John Paul Spearman, Austin, TX (US); Varun Ajay Kulkarni, Cedar Park, TX (US); Yong Yan, Leander, TX (US); Xiangdong Wang, Carlisle, MA (US); Peter L. Chu, Lexington, MA (US); David A. Bryan, Cedar Park, TX (US)

(73) Assignee: PLANTRONICS, INC., Santa Cruz, CA (US)

( * ) Notice: Subject to any disclaimer, the term of this patent is extended or adjusted under 35 U.S.C. 154(b) by 0 days.

(21) Appl. No.: 17/343,424

(22) Filed: Jun. 9, 2021

(65) Prior Publication Data

US 2022/0400216 A1    Dec. 15, 2022

(51) Int. Cl.
| | |
|---|---|
| *H04N 5/268* | (2006.01) |
| *H04N 7/18* | (2006.01) |
| *G10L 25/78* | (2013.01) |
| *H04N 7/15* | (2006.01) |
| *G06V 20/40* | (2022.01) |
| *G06V 40/16* | (2022.01) |
| *H04R 1/08* | (2006.01) |

(52) U.S. Cl.
CPC ............ *H04N 5/268* (2013.01); *G06V 20/40* (2022.01); *G06V 40/168* (2022.01); *G10L 25/78* (2013.01); *H04N 7/15* (2013.01); *H04N 7/181* (2013.01); *H04R 1/08* (2013.01)

(58) Field of Classification Search
CPC ...................................................... H04N 5/268
See application file for complete search history.

(56) References Cited

U.S. PATENT DOCUMENTS

| | | | |
|---|---|---|---|
| 10,904,485 B1 | 1/2021 | Childress, Jr. et al. | |
| 11,184,560 B1 * | 11/2021 | Mese | G10L 17/00 |
| 2011/0285808 A1 | 11/2011 | Feng et al. | |
| 2021/0051035 A1 | 2/2021 | Atkins et al. | |

OTHER PUBLICATIONS

Wang, C.E. et al., Real-Time Automated Video and Audio Capture with Multiple Cameras and Microphones, Journal of VLSI Signal Processing, 29, 81-99, 2001.

* cited by examiner

*Primary Examiner* — Daniel T Tekle

(57) ABSTRACT

Multiple cameras in a conference room, each pointed in a different direction and including a microphone array to perform sound source localization (SSL). The SSL is used in combination with the video image to identify the speaker from among multiple individuals that appear in the video image. Neural network or machine learning processing is performed on the identified speaker to determine the quality of the front or facial view of the speaker. The best view of the speaker's face from the various cameras is selected to be provided to the far end. If no view is satisfactory, a default view is selected and that is provided to the far end. The use of the SSL allows selection of the proper individual from a group of individuals in the conference room, so that only the speaker's head is analyzed for the best facial view and then framed for transmission.

20 Claims, 14 Drawing Sheets

INTELLIGENT MULTI-CAMERA SWITCHING WITH MACHINE LEARNING

TECHNICAL FIELD

This disclosure relates generally to camera selection in a videoconference.

BACKGROUND

The most common configuration of a conference room for videoconferencing has a single camera adjacent a monitor or television that sits at one end of the room. One drawback to this configuration is that if a speaker is looking at someone else in the conference room while talking, the speaker does not face the camera. This means that the far end only sees a side view of the speaker, so the speaker does not appear to be speaking to the far end.

Efforts have been made to address this problem by providing multiple cameras in the conference room. The idea is to have the cameras pointed in different directions and then selecting a camera that provides the best view of the speaker, preferably zooming and framing the speaker. The efforts improved the view of the speaker but only in single individual settings, which often were not a problem as the speaker would usually be looking at the monitor and hence the single camera. If multiple individuals were present in the conference room and visible in the various camera views, the efforts did not provide good results.

SUMMARY

Examples according to the present disclosure include multiple cameras in a conference room, each pointed in a different direction. Each camera includes a microphone array to perform sound source localization (SSL). The SSL is used in combination with a video image to identify the speaker from among multiple individuals that appear in the video image. Neural network or machine learning processing is performed on the identified speaker to determine the quality of the front or facial view of the speaker. The best view of the speaker's face from the various cameras is selected to be provided to the far end. If no view is satisfactory, a default view is selected and that is provided to the far end. The use of the SSL allows selection of the proper individual from a group of individuals in the conference room, so that only the speaker's head is analyzed for the best facial view and then framed for transmission to the far end.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

Figure 1:
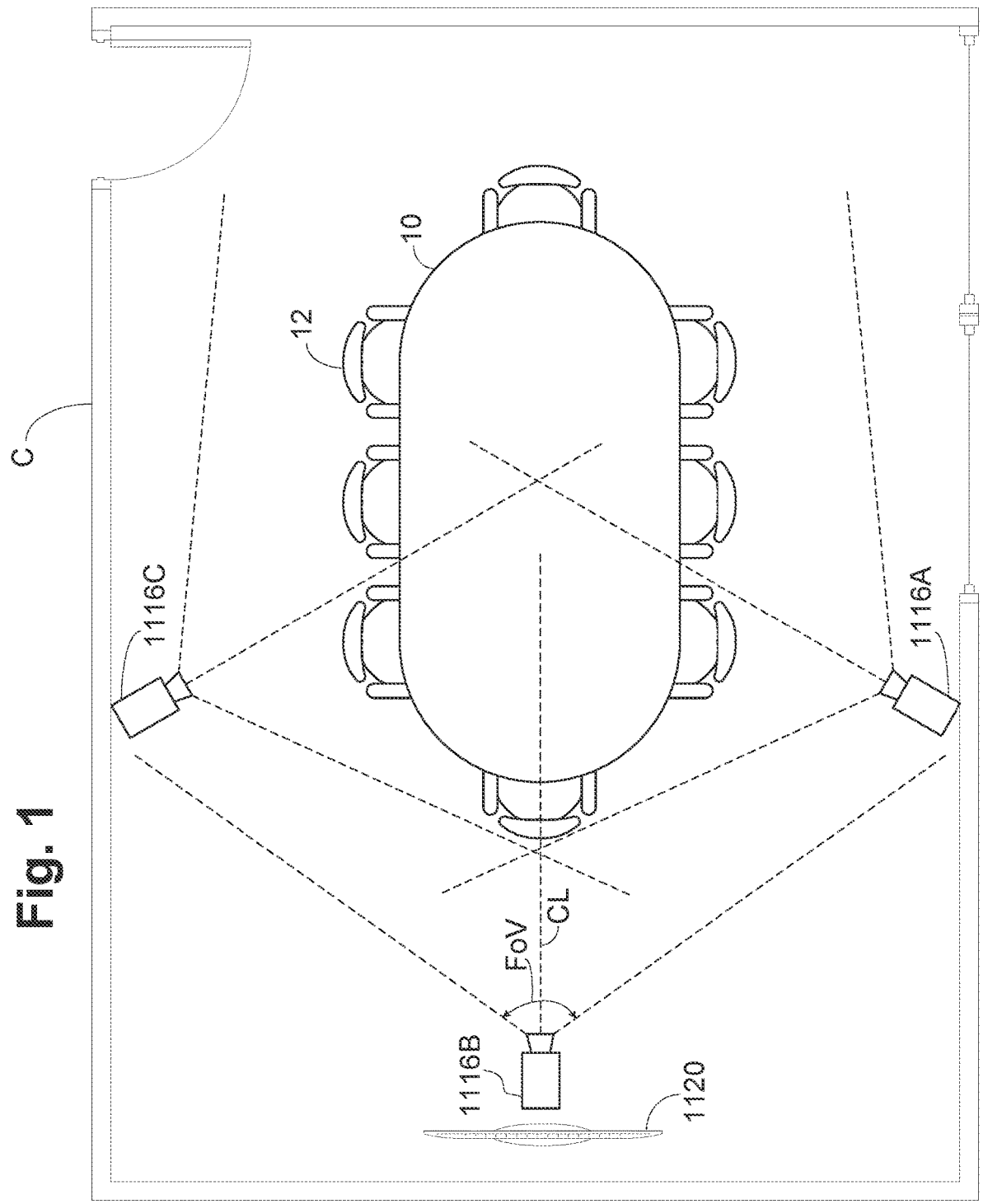
FIG. 1 is an illustration of a conference room containing three cameras, a monitor and desk and chairs.

In the drawings and the description of the drawings herein, certain terminology is used for convenience only and is not to be taken as limiting the examples of the present disclosure. In the drawings and the description below, like numerals indicate like elements throughout.

Throughout this disclosure, terms are used in a manner consistent with their use by those of skill in the art, for example:

Computer vision is an interdisciplinary scientific field that deals with how computers can be made to gain high-level understanding from digital images or videos. Computer vision seeks to automate tasks imitative of the human visual system. Computer vision tasks include methods for acquiring, processing, analyzing and understanding digital images, and extraction of high-dimensional data from the real world to produce numerical or symbolic information. Computer vision is concerned with artificial systems that extract information from images. Computer vision includes algorithms which receive a video frame as input and produce data detailing the visual characteristics that a system has been trained to detect.

A convolutional neural network is a class of deep neural network which can be applied analyzing visual imagery. A deep neural network is an artificial neural network with multiple layers between the input and output layers.

Artificial neural networks are computing systems inspired by the biological neural networks that constitute animal brains. Artificial neural networks exist as code being executed on one or more processors. An artificial neural network is based on a collection of connected units or nodes called artificial neurons, which mimic the neurons in a biological brain. Each connection, like the synapses in a biological brain, can transmit a 'signal' to other neurons. An artificial neuron that receives a signal then processes it and can signal neurons connected to it. The signal at a connection is a real number, and the output of each neuron is computed by some non-linear function of the sum of its inputs. The connections are called edges. Neurons and edges have weights, the value of which is adjusted as 'learning' proceeds and/or as new data is received by a state system. The weight increases or decreases the strength of the signal at a connection. Neurons may have a threshold such that a signal is sent only if the aggregate signal crosses that threshold.

Referring now to FIG. 1, a conference room C configured for use in videoconferencing is illustrated. Conference room C includes a conference table 10 and a series of chairs 12. A series of three cameras 1116A, 1116B and 1116C are provided in the conference room C to view individuals seated in the various chairs 12. A monitor or television 1120 is provided to display the far end conference site or sites and generally to provide the loudspeaker output. Each camera 1116A, 1116B, 1116C has a field-of-view (FoV) and an axis or centerline (CL). Each of the cameras 1116A, 1116B, 1116C includes a microphone array 1214 to be used to do sound source localization (SSL). In the layout of FIG. 1, the cameras 1116A, 1116B, 1116C are positioned such that camera 1116B has its CL centered on the length of the conference table 10 and cameras 1116A and 1116C are at an angle to the conference table 10. This allows the cameras 1116A and 1116C to have a better opportunity to see the faces of individuals seated on the sides of the conference table 10 when the individuals are looking at other individuals in the conference room C, while camera 1116B has a better opportunity to see the faces when the individuals are looking at the monitor 1120.

Figure 2:
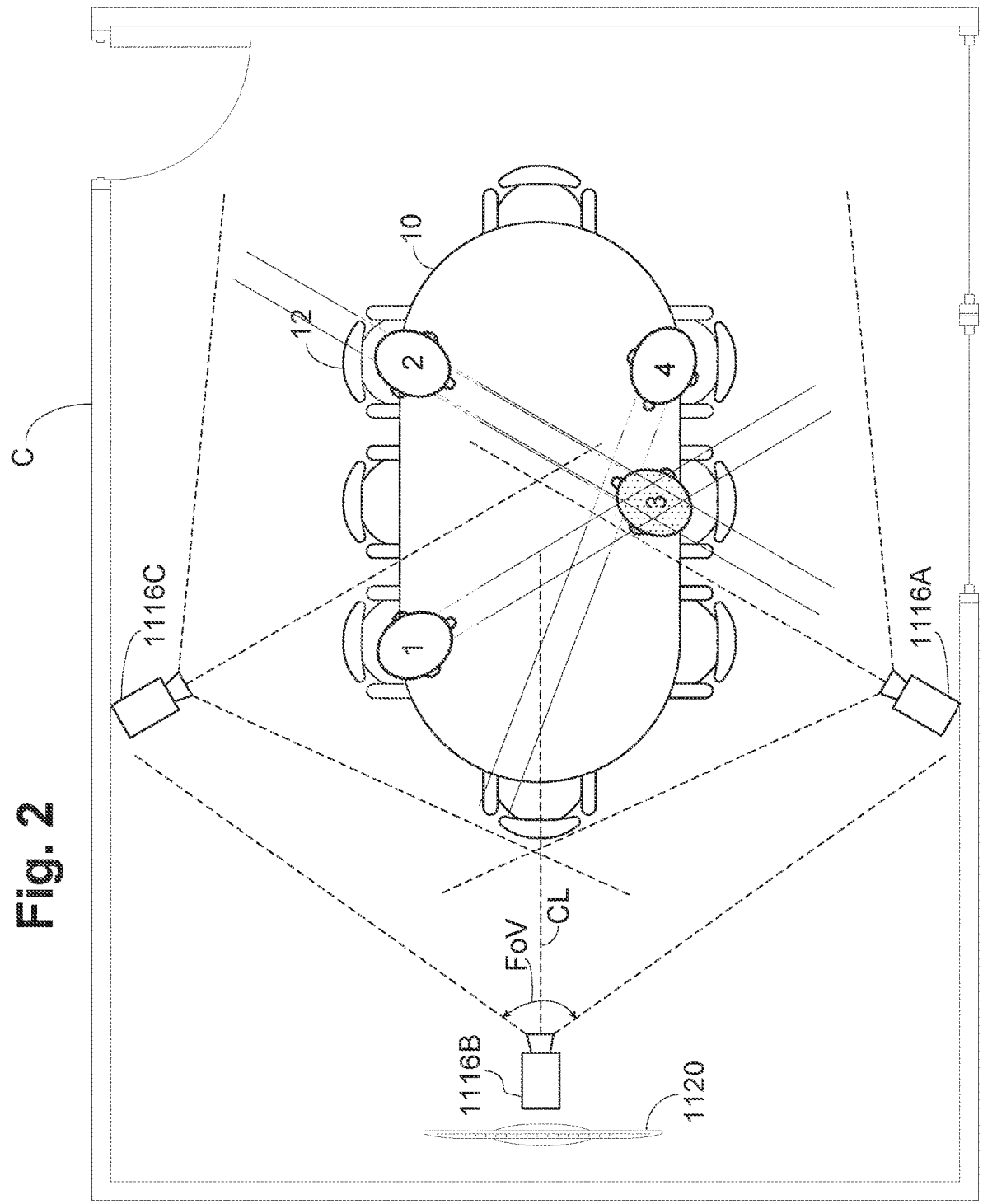
FIGS. 2-6 are illustrations of the conference room of FIG. 1 with various individuals, with one individual speaking.

Turning now to FIG. 2, four individuals 1, 2, 3, and 4 are seated in various of the chairs 12. Individual 3 is speaking, as indicated by the shading of individual 3. As individual 3 is speaking, each of the individuals 1, 2 and 4 have turned to look at individual 3. The camera 1116A is viewing the back of the head of individual 3, while camera 1116B is viewing basically the left ear of individual 3 and camera 1116C has the best shot of individual 3's face. Therefore, it is desirable to use the camera 1116C to provide a view of the face of individual 3 for provision to the far end. It is noted that individual 3 may be partially blocked by individual 1 in the field-of-view of camera 1116C. If the blockage is too great, then the best view is provided by camera 1116B, which is not a particularly satisfactory view and therefore may not be selected as a best camera view as described below.

Figure 3:
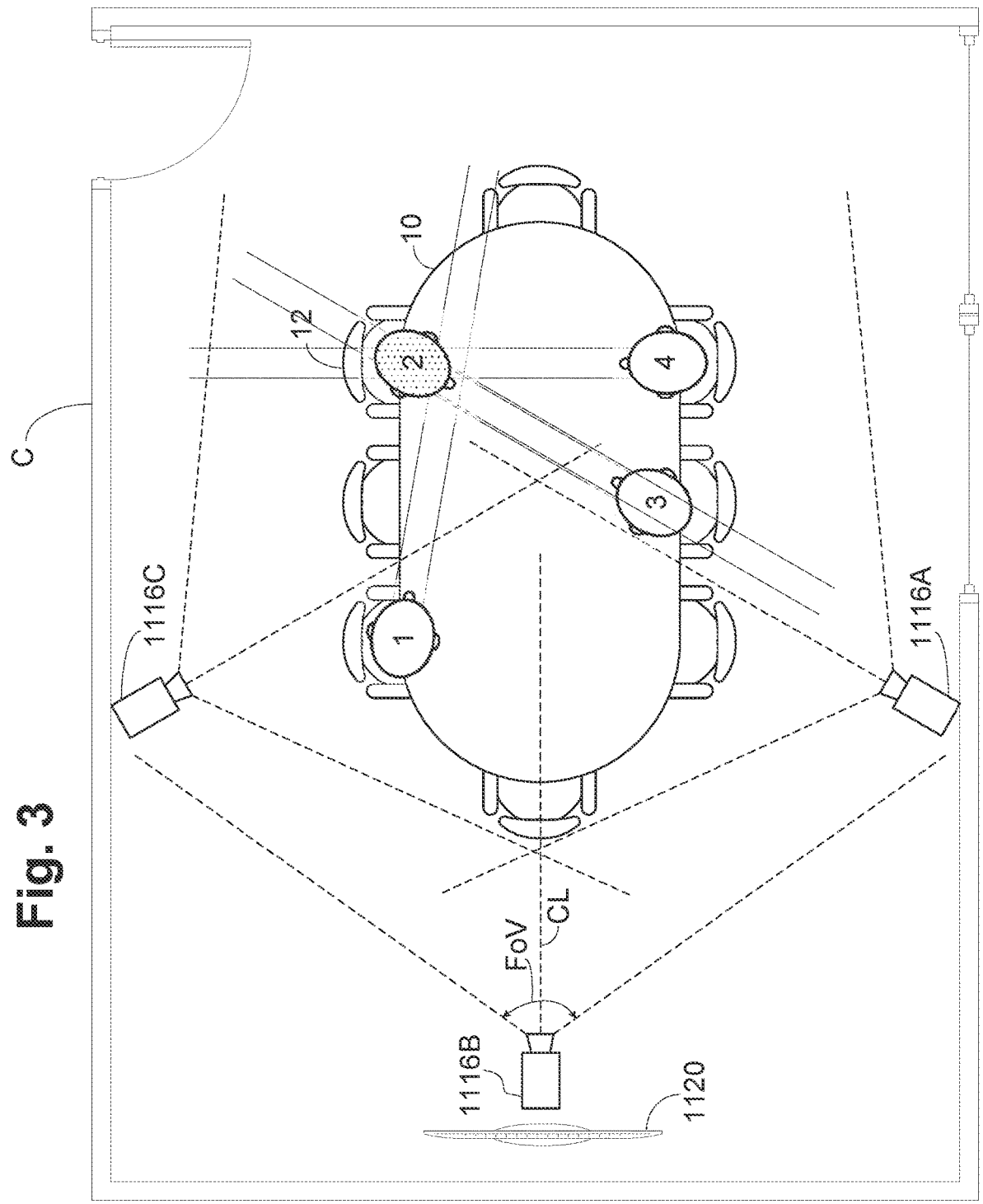
Figure 4:
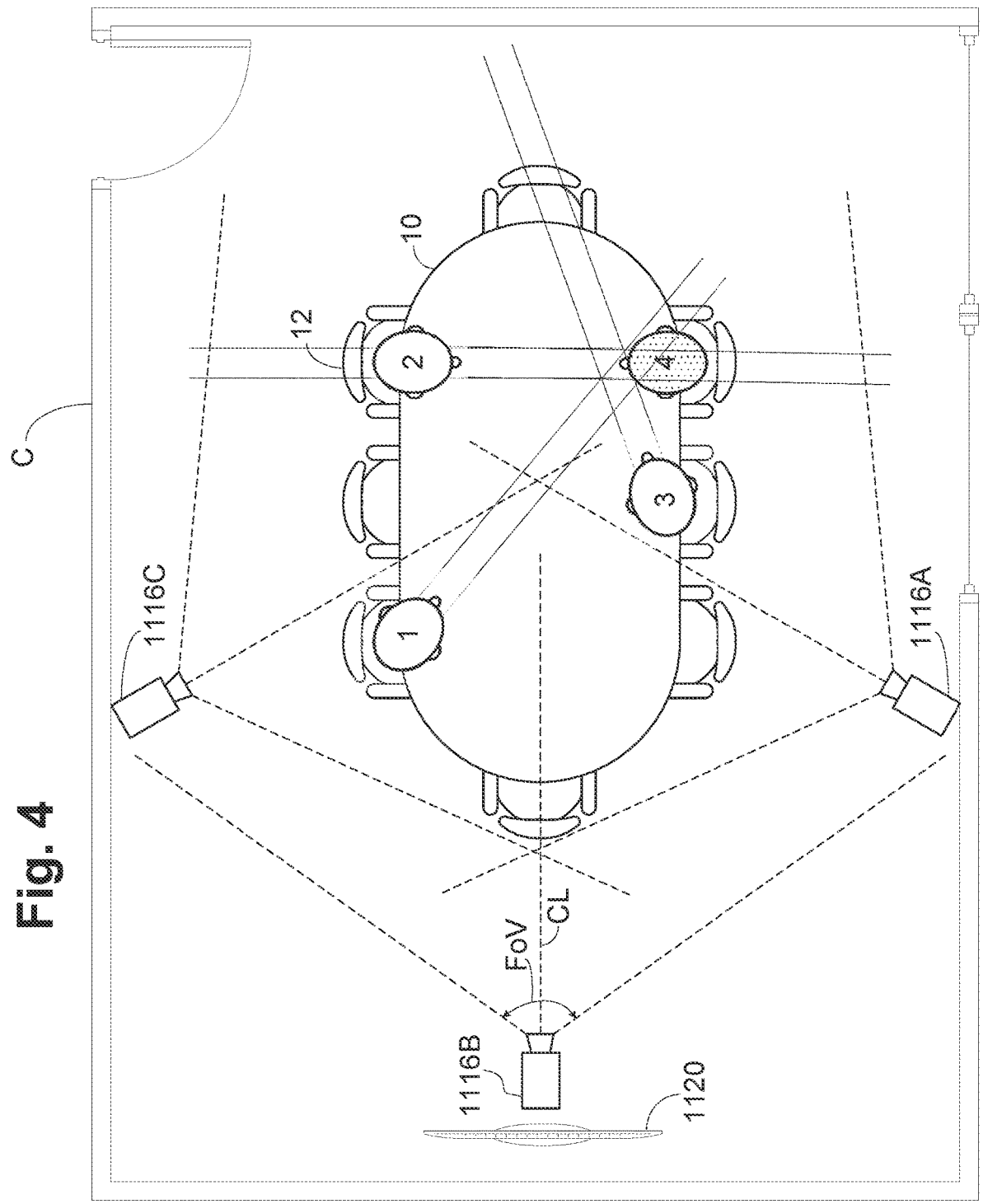
Figure 5:
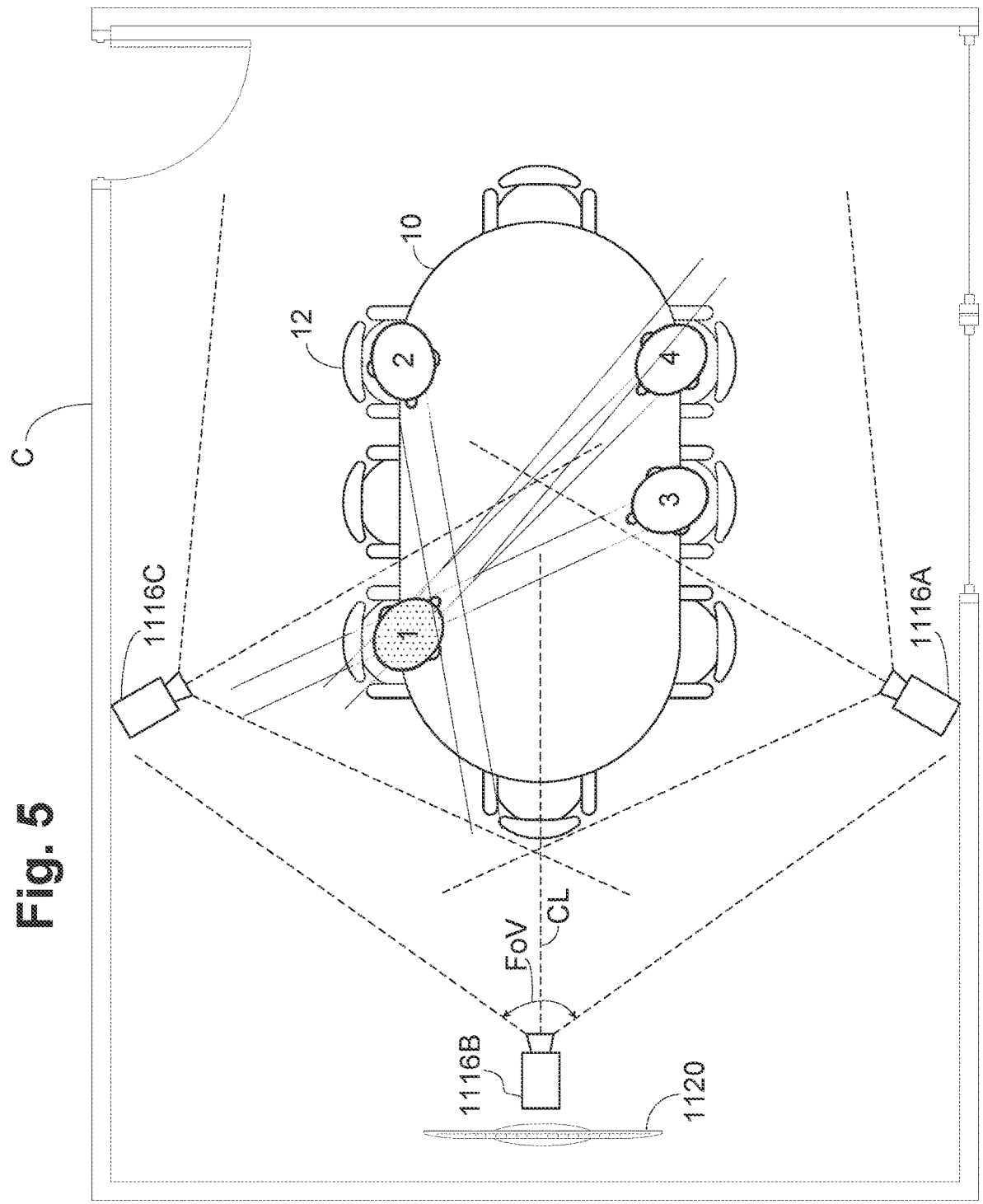
Figure 6:
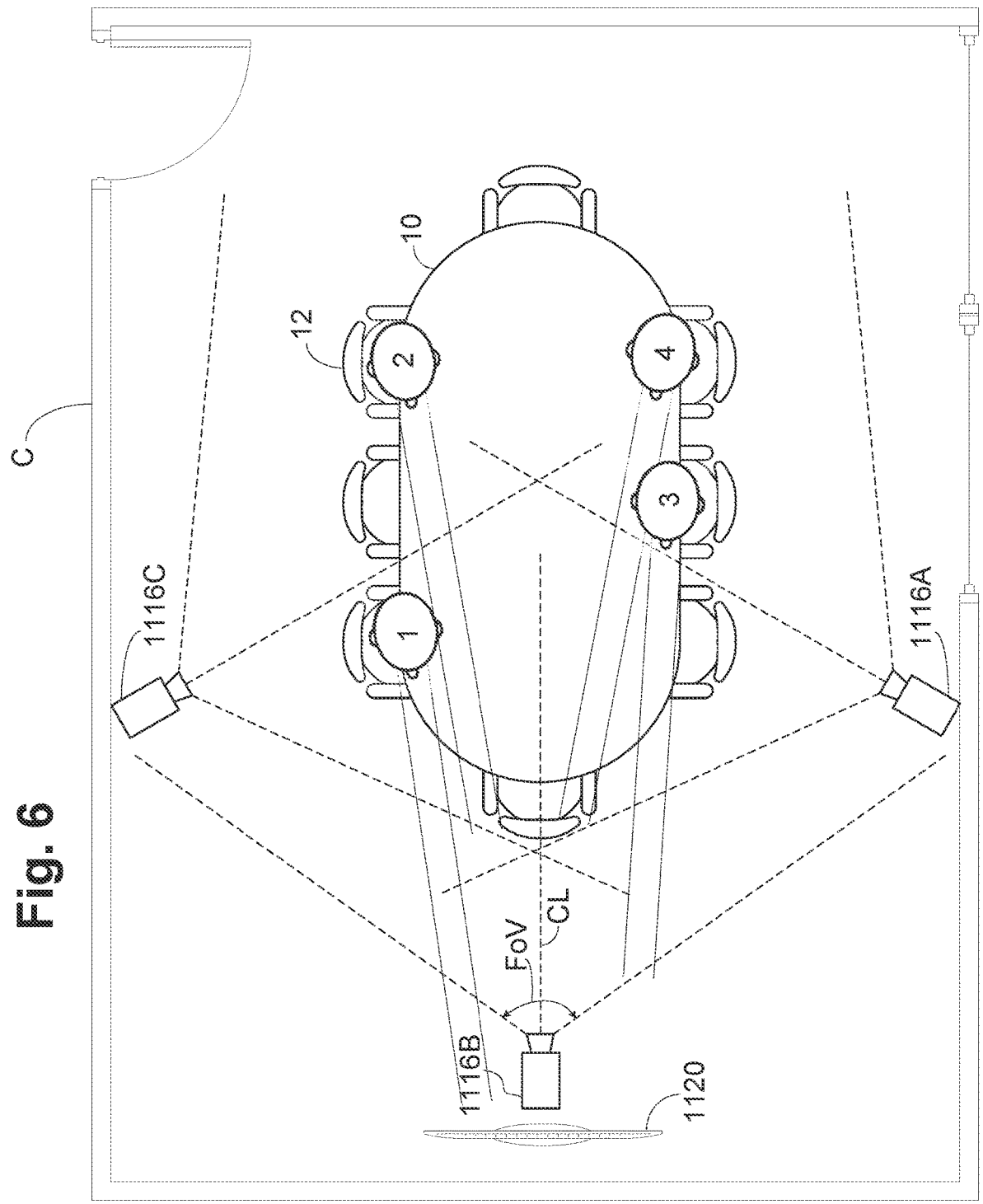

In FIG. 3, individual 2 has become the speaker and now individuals 1, 3 and 4 are facing individual 2. While camera 1116A has the most direct review of individual 2's face, individual 3 almost completely blocks the view of individual 2 for camera 1116A and therefore the best shot of the face of individual 2 is provided by camera 1116B. In FIG. 4, individual 4 is now speaking in individuals 1, 2 and 3 are facing individual 4. Camera 1116C has a completely clear shot to the face of individual 4. Therefore, the video stream from camera 1116C is preferred to be transmitted to the far end. In FIG. 5, individual 1 is now speaking, with individuals 2, 3 and 4 facing individual 1. Cameras 1116B and 1116C both have poor views of individual 1, while camera 1116A has the best view of individual 1. As discussed below this may be good enough to transmit to the far end but the exact details have to be considered. In FIG. 6, there are no individuals in the conference room C are speaking but rather the far end is speaking, so all of the individuals 1, 2, 3, 4 are facing the monitor 1120. As no individuals in the conference room C are speaking, camera 1116B provides the best view of the entire room and therefore the video stream from camera 1116B is provided to the far end. If individual 3 is in a conversation with a speaker from the far end, all individuals 1, 2, 3, 4 may be facing the monitor 1120, but individual 3 is speaking. Camera 116B will have the best view of individual 3's face, so a framed version of the individual 3's face is provided to the far end, as opposed to a view of the entire room when no individuals are speaking.

It is noted in FIGS. 2-6 that each of the cameras 1116A, 1116B, 1116C can see all four individuals. This means that each of the cameras 1116A, 1116B, 1116C has the possibility of seeing the face of the speaking individual. To determine the particular individual that is speaking, the microphone array 1214 present on each of the cameras 1116A, 1116B, 1116C is utilized with a sound source localization algorithm to determine the particular individual which is speaking and that individual's angle in the field-of-view of the particular camera. The processing of the video from the particular camera 1116A, 1116B, 1116C selects that angle and the appropriate area in the image to look for the face of the speaking individual. This allows the correct speaker to be located and a zoomed version of the individuals face can be provided if available and satisfactory.

Figure 7:
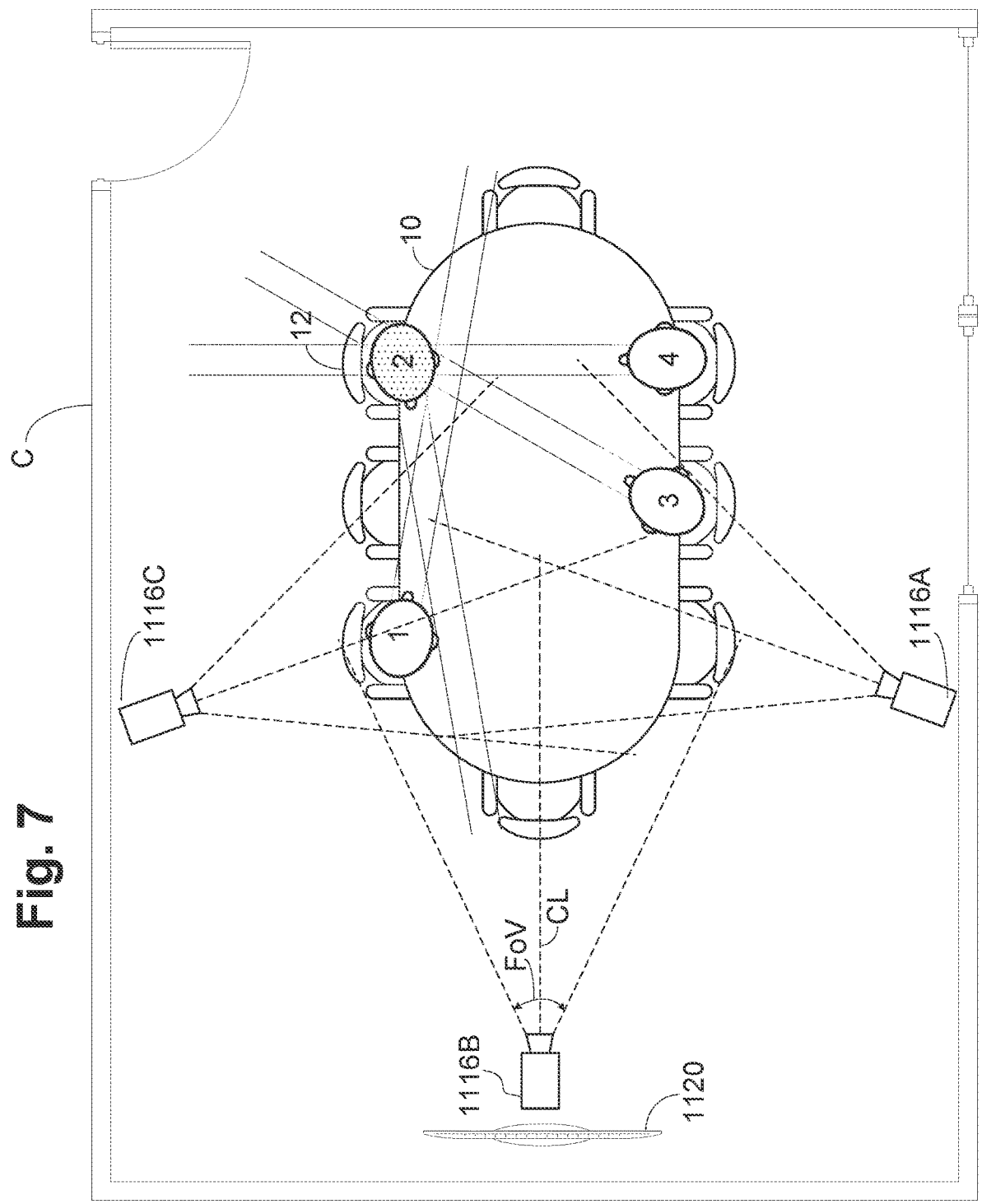
FIG. 7 is an illustration of the conference room of FIG. 1 with narrower camera angles, various individuals and one individual speaking.

In FIG. 7, it is noted that the field-of-view of the cameras 1116A, 1116B, 1116C has been reduced so that not all of the individuals are necessarily in the field-of-view of a given camera. For example, individual 4 is not in the field-of-view of camera 1116A and individual 2 is not in the field-of-view of camera 1116C. If individual 2 is speaking, as shown in FIG. 7 by the highlighting of individual 2, because the sound source localization based on the microphone array 214 in the camera C indicates that the angle of the speaking individual is outside the field-of-view, the video from camera 1116C would not be utilized as it would not contain the speaker. As cameras 1116A and 1116B both have individual 2 in their fields-of-view, selection for a view of the face of the individual 2 is made from cameras 1116A or 1116B.

Figure 11:
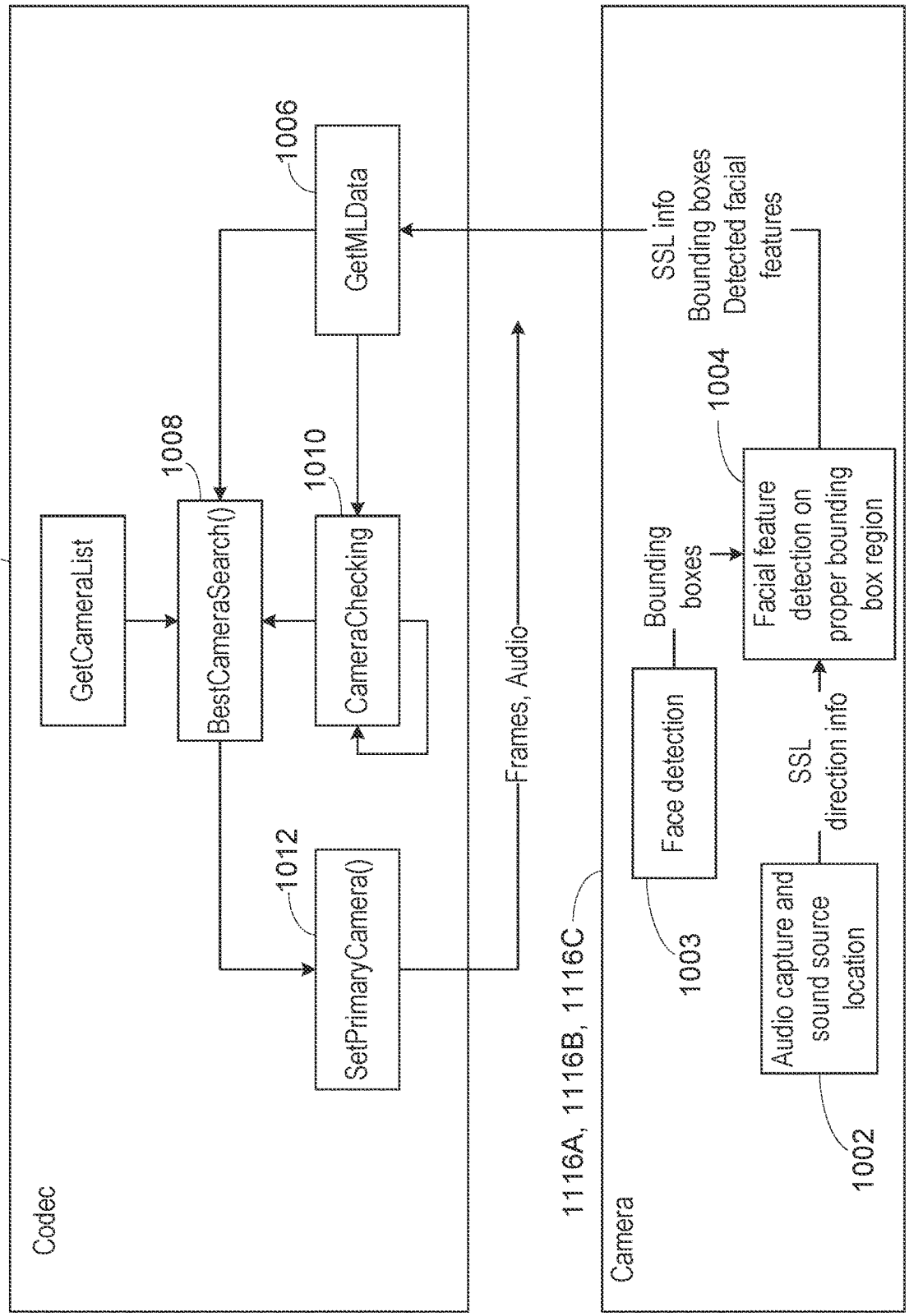
FIG. 11 is an illustration of division of operations between a codec and a camera according to an example of this disclosure.

In the preferred example, the processing of the audio and video and selection of a desired camera is split between the cameras 1116A, 1116B, 1116C and a codec 1100. Referring to FIG. 11, the camera 1116A, 1116B, 1116C performs sound source localization in step 1002 based on sound received at the microphone array 1214 and provides direction information. One example of performing SSL is provided in U.S. Pat. Nos. 6,912,178 and 7,787,328, which are hereby incorporated by reference. In step 1003, a camera image is processed to detect faces. This is preferably done using a neural network to provide a series of bounding boxes, one for each face. There are numerous variations of neural networks to perform face detection and provide bounding box outputs. Facial features of the speaker are developed in step 1004. The SSL direction information of step 1002 is combined with the bounding boxes provided by step 1003 to select the area of the camera image to be analyzed by a neural network to determine facial features or keypoints of the speaker, such as left and right eye, left and right ear and nose, that are present in the camera view. As with face detection, there are numerous variations of neural networks to determine facial features. For example, in one preferred example, the neural network performs pose estimation and has outputs including a score and indications of the presence of keypoints or facial features. In a different example, the neural network detects facial landmarks and provides an output of the locations of the landmarks. Step 1004 provides the SSL direction information, the bounding boxes and the facial feature list to the codec 1100. The video stream from the camera 1116A, 1116B, 1116C is also provided to the codec 1100.

It is understood that the SSL determination, face detection and facial features analysis is only performed periodically, not for every video frame, such as once every one second to once every five seconds in some examples. This is satisfactory as the speaker and the individual's location do not change much faster than those periods and because camera switching should not be performed rapidly to avoid disorienting the far end.

It is understood that steps 1003 and 1004 are illustrated as separate steps. The face detection and facial feature detection can be combined in a single neural network, so that steps 1003 and 1004 are then merged. Such single neural network would combine the SSL direction information and video image to determine the speaker from among the individuals and the facial features of that individual in the processing performed by the single neural network. The actual operation of the single neural network may not operate in the order as illustrated in the serial operations of steps 1003 and 1004, as the neural network may process all of the input data in parallel, but the functional result of the operation of the single neural network will be the same as the series operation of steps 1003 and 1004, namely the facial features of the speaker.

In step 1006 the codec 1100 receives SSL direction information, the bounding boxes and the detected facial features from each camera 1116A, 1116B, 1116C. The SSL direction information and the detected facial features, or pose information if that is provided, are provided to a best camera searching step 1008 and a camera checking step 1010. The best camera searching step 1008, shown in more detail in FIG. 9, determines which of the various cameras 1116A, 1116B, 1116C has the best view of the face of speaking individual when evaluation is necessary, while the camera checking step 1010, shown in more detail in FIG. 10, continuously monitors the presently selected camera view to determine if reevaluation of the best camera is appropriate. The best camera search step 1008 determines the particular camera 1116A, 1116B, 1116C whose video stream is to be provided to the far end in step 1012. The video from the selected camera 1116A, 1116B, 1116C and the audio from microphones 1114A, 1114B connected to the codec 1100 are provided to the far end.

It is understood that the codec 1100 may perform framing operations on the video stream from the selected camera if desired, rather than providing the entire image from the selected camera. The framing process is simplified by utilizing the bounding boxes from the cameras. Additionally, the codec 1100 may provide video from other cameras based on framing considerations, such as if two individuals are having a conversation. The steps of FIG. 11 provide the information of the best camera to capture the speaker's face and that information is one input into framing and combining operations of the codec 1100, which are not shown.

Figure 8:
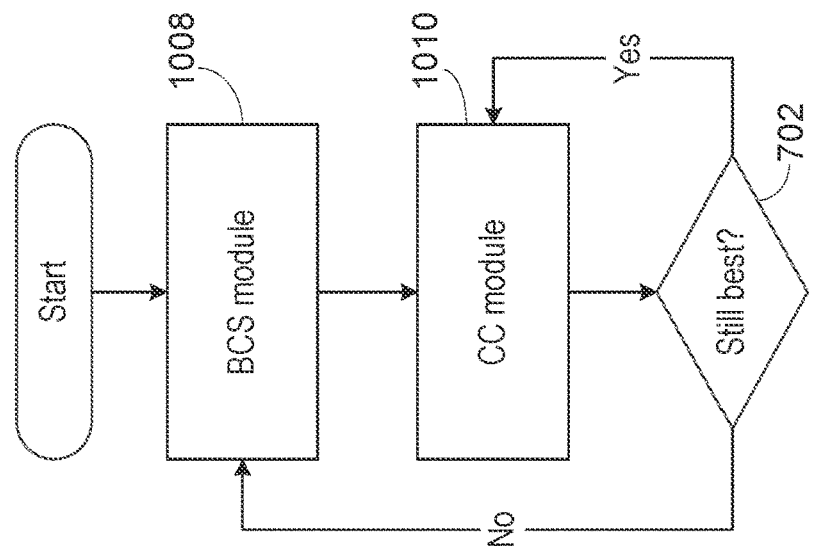
FIG. 8 is a flowchart of operation of a videoconferencing system according to an example of this disclosure.

FIG. 8 is a high-level flowchart of the interaction of the best camera search step 1008 and the camera checking step 1010. As is mentioned, the best camera search step 1008 determines the best view of the desired individual and selects a particular camera. Once the camera has been selected, control proceeds to the camera check step 1010, which analyzes various parameters as described below to determine if the selected camera is still the best camera. If so, as determined in step 702, then operation returns to the camera checking step 1010. If it is determined that the selected camera may not be the best camera as determined in step 702, operation returns to the best camera search step 1008.

Figure 9:
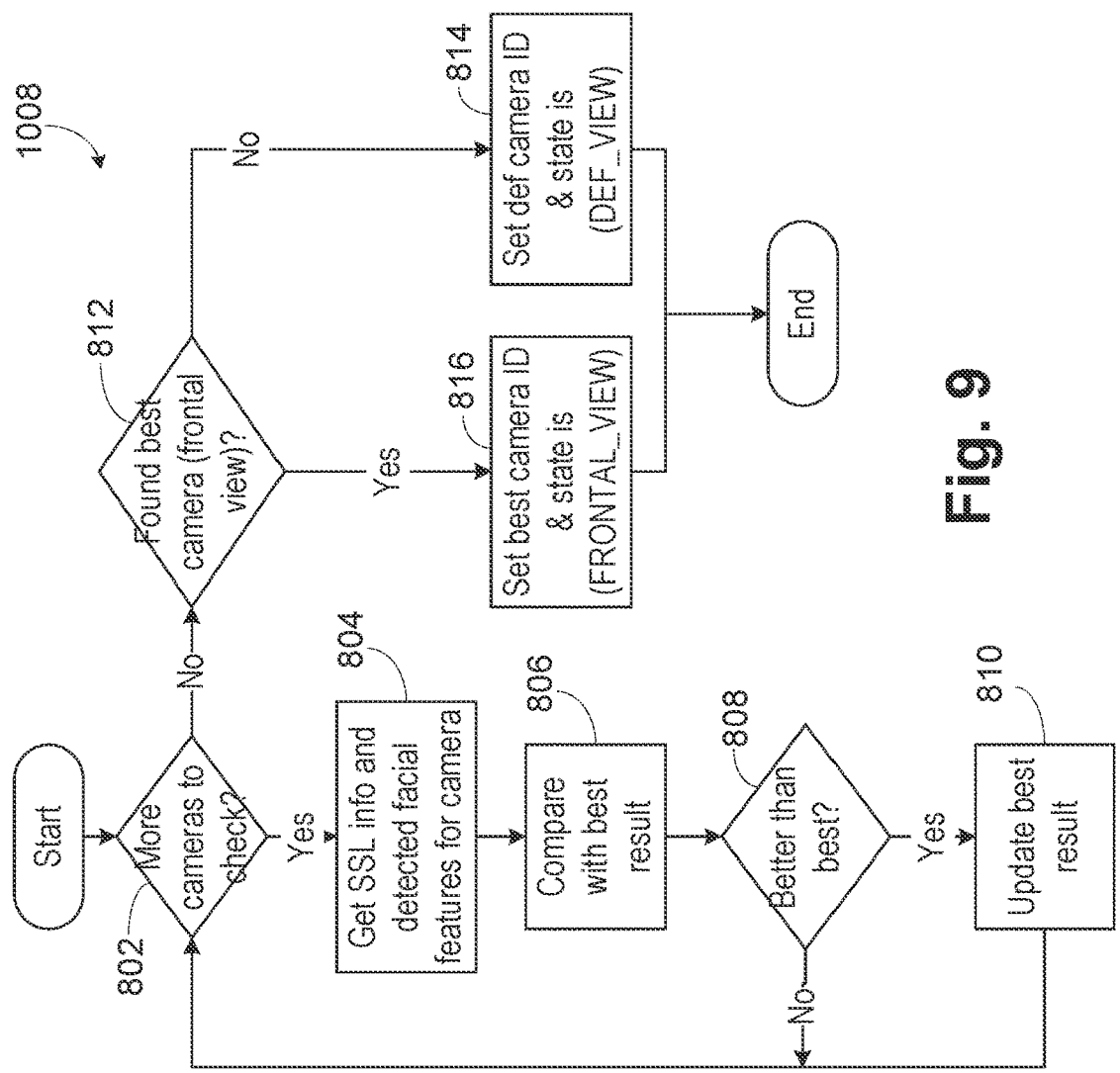
FIG. 9 is a flowchart of operation of the best camera search step of FIG. 8 according to an example of this disclosure.

Referring to FIG. 9, the best camera search step 1008 is illustrated in more detail. In step 802, it is determined if there are any more cameras to check. If so, in step 804 the SSL direction information and facial features detected for the particular camera are obtained and then in step 806 are compared or evaluated against the best result, the best result being cleared before processing the first camera. In a simplistic form, the comparison is between the number and type of detected facial features. For example, left and right eyes and nose is better than left eye and nose, which is better than left ear and left eye, which is better than just left ear. A precursor analysis can be performed using the SSL direction information. If the SSL direction information indicates the speaker is outside the field-of-view of the camera, so that the camera cannot see the speaker, the feature comparison can be skipped. If the SSL direction information indicates there is no speaker, the feature comparison can also be skipped. In one example, if only an ear or only an ear and an eye are detected, the feature comparison can also be skipped, as the detected features are insufficient to provide a good enough view of the speaker's face to provide to the far end. These are just a brief explanation of one example of the factors used in the comparison step and other factors and evaluations can be used.

Step 808 evaluates whether the quality of facial features provided by the camera is better than the previous best. If so, the parameters and values of the camera are stored in the best result in step 810. If not better than the best in step 808 or after updating in step 810, operation returns to step 802 to determine if there are any more cameras to check.

When no more cameras are ready to check, as in the example all of cameras 1116A, 1116B, and 1116C have been evaluated, operation proceeds to step 812 determine if the best camera view indicates a satisfactory frontal view of the individual was found. It may be that the best view as determined is only a side view or partial side view as discussed above, as well as the cases of no facial features and no speakers. If that is the situation, there is no acceptable frontal view of the individual to be provided to the far end, and in step 814 the selected camera is set to be a default camera, such as camera 1116B which provides a full room view, and a state of DEF_VIEW or default view is set. The default camera is preferably identified during setup of the videoconferencing system. If an acceptable or satisfactory frontal view is present, as determined in step 812, in step 816 that camera is set to be the desired or selected camera and a FRONTAL_VIEW or frontal view state is set.

Figure 10:
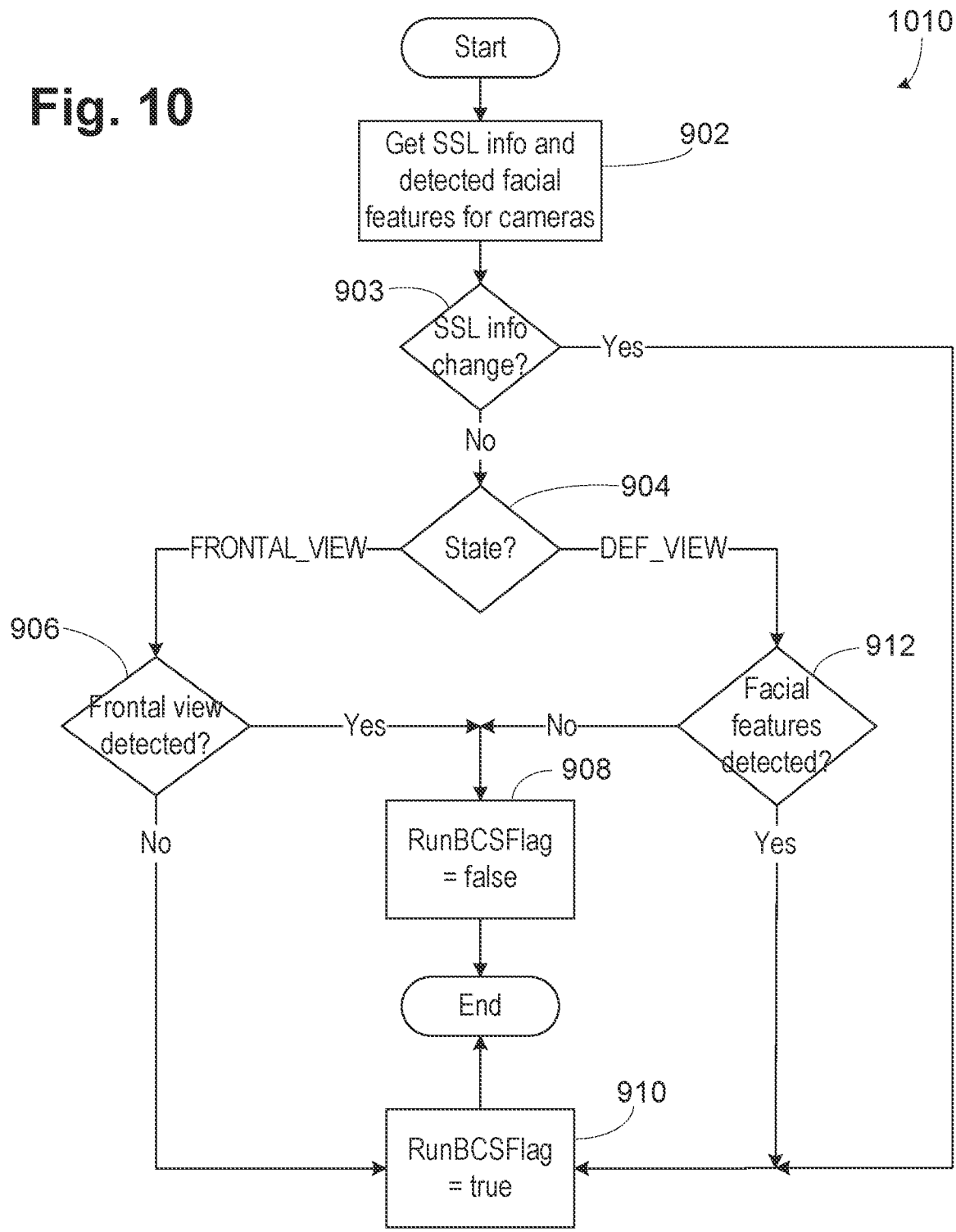
FIG. 10 is a flowchart of operation of the camera checking step of FIG. 8 according to an example of this disclosure.

FIG. 10 illustrates the camera checking step 1010 in further detail. In step 902, the SSL information and detected facial features of the cameras are obtained. In step 903 it is determined if the SSL direction information has changed. If the SSL direction information shows a large change in direction, indicating the speaker likely has changed; goes to zero, indicating there is no longer a speaker; or increases from zero to a sufficient level, indicating that a speaker has started, reevaluation of the best camera is appropriate. Therefore, if the SSL direction information has changed, operation proceeds to step 910, where a RunBCSFlag, a flag to indicate the need to execute the best camera search step 1008, is set true, so that as determined in FIG. 8, step 702, the best camera search step 1008 is performed. If the SSL direction information has not changed in step 9-3, in step 904 it is determined if the state is the frontal view state or the default view state. If it is the FRONTAL_VIEW state, operation proceeds to step 906 to determine if a satisfactory frontal view, as discussed above, is currently still detected by the selected camera by evaluating the detected facial features of the selected camera. If a satisfactory frontal view is detected, in step 908 the RunBCSFlag, is set to false. If there is no longer a satisfactory frontal view in the selected camera, in step 910 the RunBCSFlag is set to true. If in step 904 it is determined that the default view is being utilized, as the state is DEF_VIEW, in step 912 the facial features of all of the cameras are reviewed to determine if any given facial features are indicated by any camera. If there are no facial features determined to be present in any of the cameras, in step 908 the RunBCSFlag is set to false as there is no better view. However, if step 912 determines that there are facial features in the video images from the cameras, in step 910 the RunBCSFlag is set to true so that the best camera search step 1008 is repeated and potentially a new camera selected.

Figure 12:
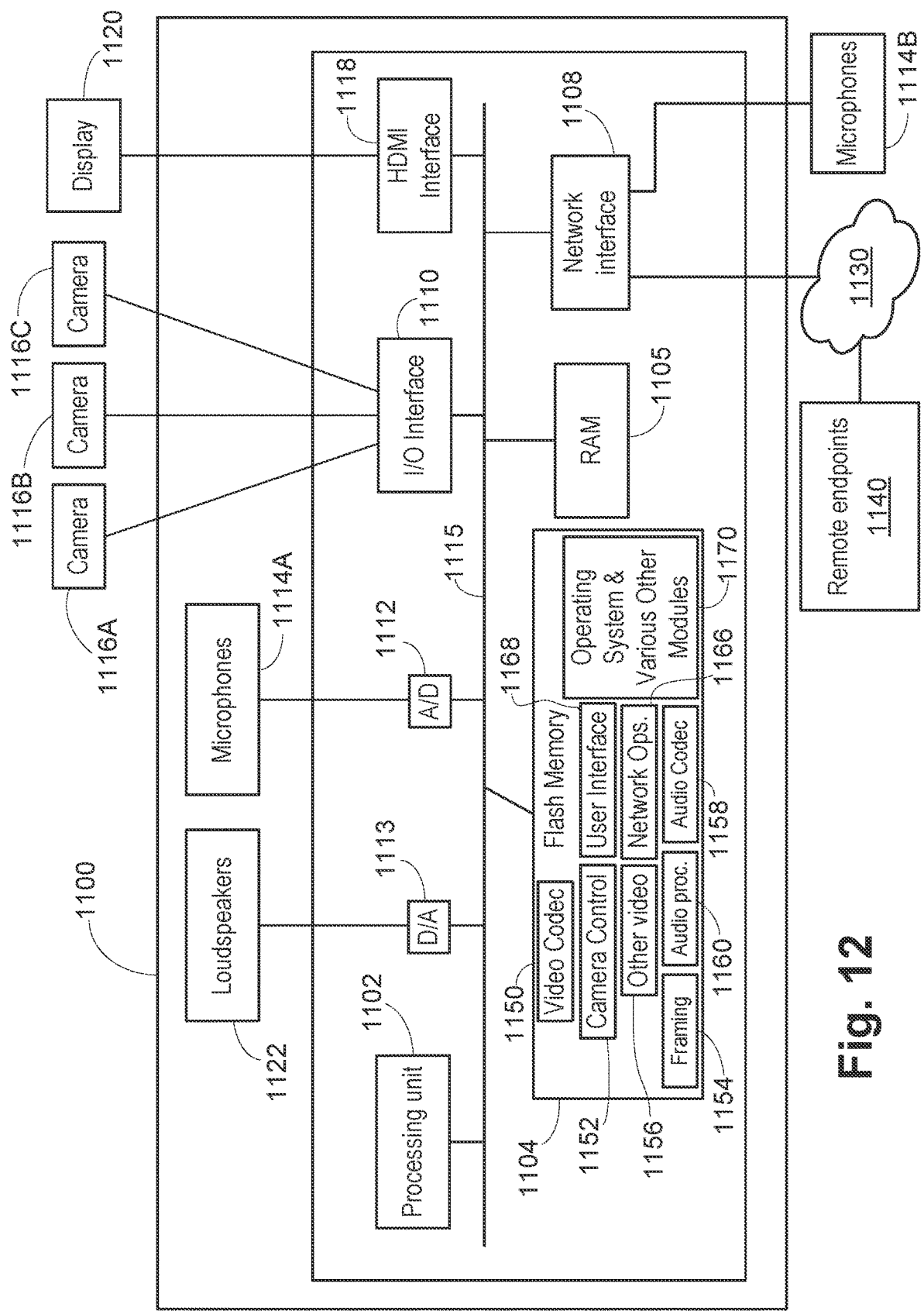
FIG. 12 is a block diagram of a codec according to an example of this disclosure.

FIG. 12 illustrates aspects of a codec 1100 in accordance with an example of this disclosure. The codec 1100 may include loudspeaker(s) 1122, though in many cases the loudspeaker 1122 is provided in the monitor 1120, and microphone(s) 1114A interfaced via interfaces to a bus 1115, the microphones 1114A through an analog to digital (A/D) converter 1112 and the loudspeaker 1122 through a digital to analog (D/A) converter 1113. The codec 1100 also includes a processing unit 1102, a network interface 1108, a flash memory 1104, RAM 1105, and an input/output (I/O) general interface 1110, all coupled by bus 1115. The camera(s) 1116A, 1116B, 1116C are illustrated as connected to the I/O interface 1110. Microphone(s) 1114B are connected to the network interface 1108. An HDMI interface 1118 is connected to the bus 1115 and to the external display or monitor 1120. Bus 1115 is illustrative and any interconnect between the elements can used, such as Peripheral Component Interconnect Express (PCIe) links and switches, Universal Serial Bus (USB) links and hubs, and combinations thereof. The cameras 1116A, 1116B, 1116C and microphones 1114A, 1114B can be contained in housings containing the other components or can be external and removable, connected by wired or wireless connections.

The processing unit 1102 can include digital signal processors (DSPs), central processing units (CPUs), graphics processing units (GPUs), dedicated hardware elements, such as neural network accelerators and hardware codecs, and the like in any desired combination.

The flash memory 1104 stores modules of varying functionality in the form of software and firmware, generically programs, for controlling the codec 1100. Illustrated modules include a video codec 1150, camera control 1152, framing 1154, other video processing 1156, audio codec 1158, audio processing 1160, network operations 1166, user interface 1168 and operating system and various other modules 1170. The RAM 1105 is used for storing any of the modules in the flash memory 1104 when the module is executing, storing video images of video streams and audio samples of audio streams and can be used for scratchpad operation of the processing unit 1102.

The network interface nob enables communications between the codec 1100 and other devices and can be wired, wireless or a combination. In one example, the network interface nob is connected or coupled to the Internet 1130 to communicate with remote endpoints 1140 in a videoconference. In one or more examples, the general interface 1110 provides data transmission with local devices such as a keyboard, mouse, printer, projector, display, external loudspeakers, additional cameras, and microphone pods, etc.

In one example, the cameras 1116A, 1116B, 1116C and the microphones 1114 capture video and audio, respectively, in the videoconference environment and produce video and audio streams or signals transmitted through the bus 1115 to the processing unit 1102. In at least one example of this disclosure, the processing unit 1102 processes the video and audio using algorithms in the modules stored in the flash memory 1104. Processed audio and video streams can be sent to and received from remote devices coupled to network interface nob and devices coupled to general interface 1110. This is just one example of the configuration of a codec 1100.

Figure 13:
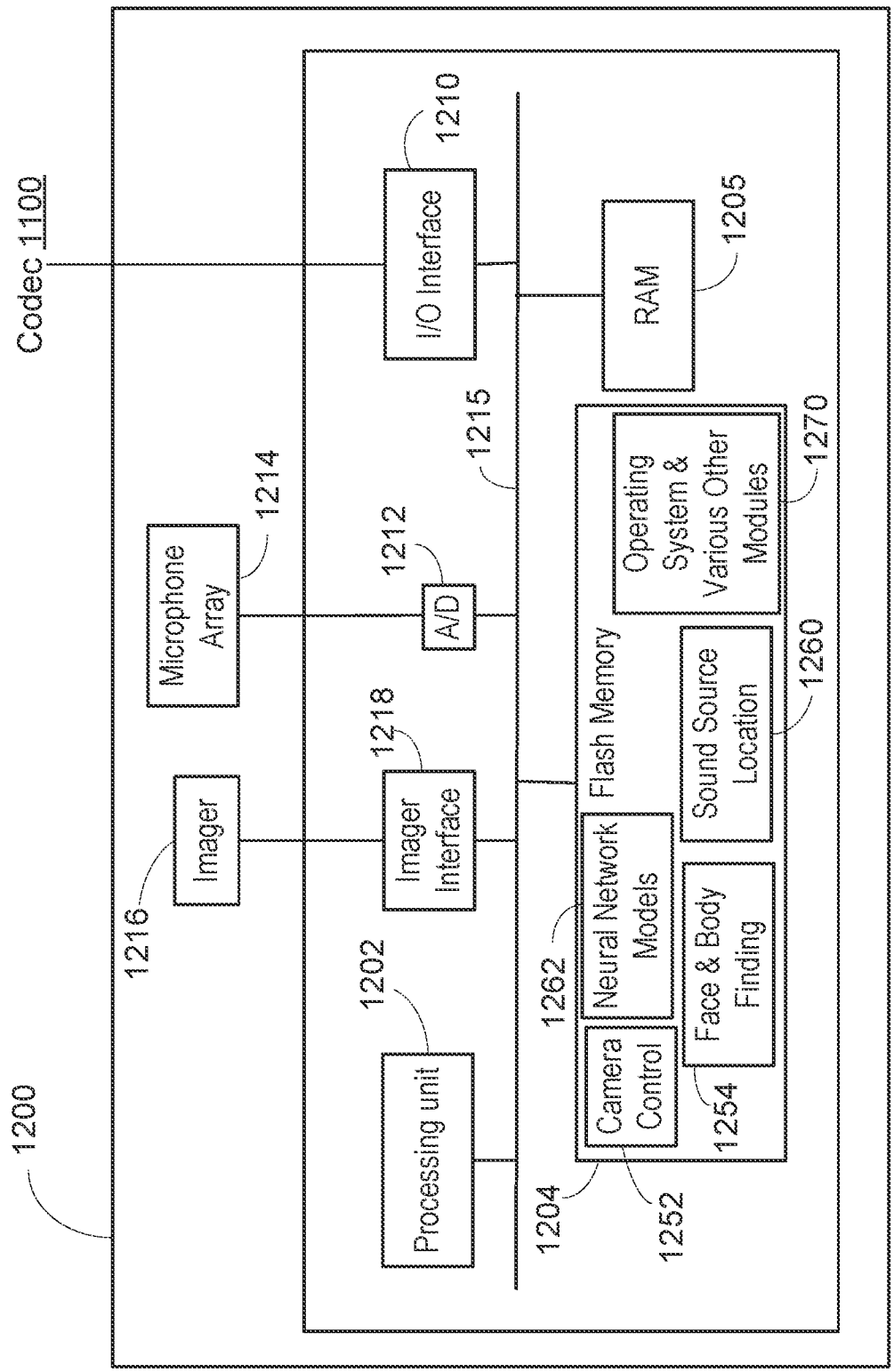
FIG. 13 is a block diagram of a camera according to an example of this disclosure.

FIG. 13 illustrates aspects of a camera 1200, in accordance with an example of this disclosure. The camera 1200 includes an imager or sensor 1216 and a microphone array 1214 interfaced via interfaces to a bus 1215, the microphone array 1214 through an analog to digital (A/D) converter 1212 and the imager 1216 through an imager interface 1218. The camera 1200 also includes a processing unit 1202, a flash memory 1204, RAM 1205, and an input/output general interface 1210, all coupled by bus 1215. Bus 1215 is illustrative and any interconnect between the elements can used, such as Peripheral Component Interconnect Express (PCIe) links and switches, Universal Serial Bus (USB) links and hubs, and combinations thereof. The codec 1100 is connected to the I/O interface 1210, preferably using a USB interface.

The processing unit 1202 can include digital signal processors (DSPs), central processing units (CPUs), graphics processing units (GPUs), dedicated hardware elements, such as neural network accelerators and hardware codecs, and the like in any desired combination.

The flash memory 1204 stores modules of varying functionality in the form of software and firmware, generically programs, for controlling the camera 1200. Illustrated modules include camera control 1252, face and body finding 1254, sound source localization 1260, neural network models 1262 and operating system and various other modules 1270. The RAM 1205 is used for storing any of the modules in the flash memory 1204 when the module is executing, storing video images of video streams and audio samples of audio streams and can be used for scratchpad operation of the processing unit 1202.

In a second configuration, the cameras are simplified and the codec capabilities and processing are increased. In this second configuration, the neural networks operate on the codec instead of the cameras. The cameras provide their raw video streams to the codec, which then are analyzed using neural networks to find the bounding boxes, pose estimations and keypoints developed by the cameras in the first configuration. In the second configuration the cameras still perform sound source localization and provide the location information to the codec. In a third configuration, the sound source localization is also performed by the codec, with the cameras providing the audio streams from each microphone. This third configuration allows for the simplest cameras, but at the expense of further increasing the processing requirements of the codec. The second configuration is a middle ground between the first and third configurations, requiring less processing from the codec but more processing in the cameras. The use of a particular configuration depends on component costs for the required performance levels.

Other configurations, with differing components and arrangement of components, are well known for both videoconferencing endpoints and for devices used in other manners.

Figure 14:
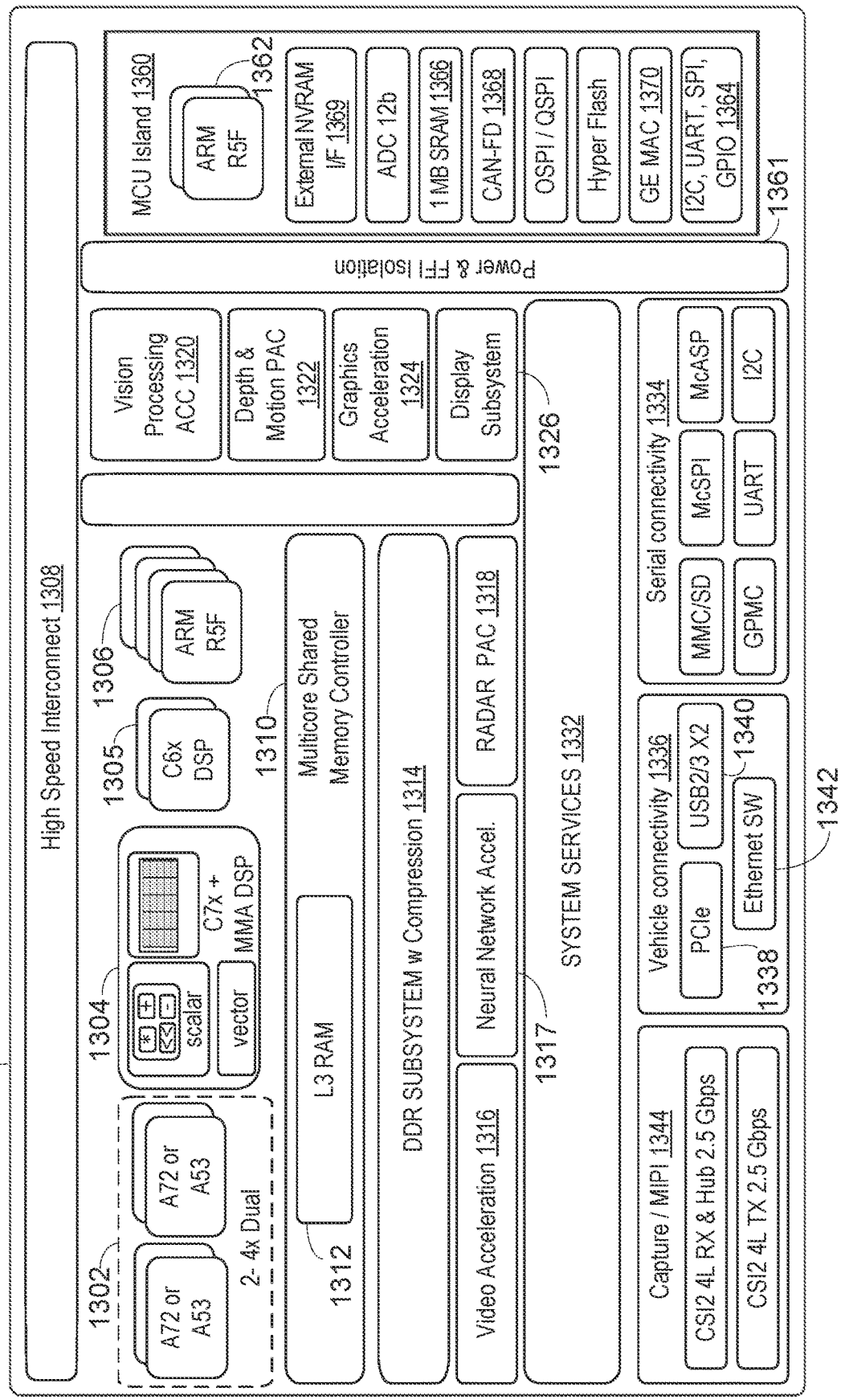
FIG. 14 is a block diagram of the processors of FIGS. 12 and 13.

FIG. 14 is a block diagram of an exemplary system on a chip (SoC) 1300 as can be used as the processing unit 1102 or 1202. A series of more powerful microprocessors 1302, such as ARM® A72 or A53 cores, form the primary general-purpose processing block of the SoC 1300, while a more powerful digital signal processor (DSP) 1304 and multiple less powerful DSPs 1305 provide specialized computing capabilities. A simpler processor 1306, such as ARM R5F cores, provides general control capability in the SoC 1300. The more powerful microprocessors 1302, more powerful DSP 1304, less powerful DSPs 1305 and simpler processor 1306 each include various data and instruction caches, such as L1I, L1D, and L2D, to improve speed of operations. A high-speed interconnect 1308 connects the microprocessors 1302, more powerful DSP 1304, simpler DSPs 1305 and processors 1306 to various other components in the SoC 1300. For example, a shared memory controller 1310, which includes onboard memory or SRAM 1312, is connected to the high-speed interconnect 1308 to act as the onboard SRAM for the SoC 1300. A DDR (double data rate) memory controller system 1314 is connected to the high-speed interconnect 1308 and acts as an external interface to external DRAM memory. The RAM 1105 or 1205 are formed by the SRAM 1312 and external DRAM memory. A video acceleration module 1316 and a radar processing accelerator (PAC) module 1318 are similarly connected to the high-speed interconnect 1308. A neural network acceleration module 1317 is provided for hardware acceleration of neural network operations. A vision processing accelerator (VPACC) module 1320 is connected to the high-speed interconnect 1308, as is a depth and motion PAC (DMPAC) module 1322.

A graphics acceleration module 1324 is connected to the high-speed interconnect 1308. A display subsystem 1326 is connected to the high-speed interconnect 1308 to allow operation with and connection to various video monitors. A system services block 1332, which includes items such as DMA controllers, memory management units, general-purpose I/O's, mailboxes and the like, is provided for normal SoC 1300 operation. A serial connectivity module 1334 is connected to the high-speed interconnect 1308 and includes modules as normal in an SoC. A vehicle connectivity module 1336 provides interconnects for external communication interfaces, such as PCIe block 1338, USB block 1340 and an Ethernet switch 1342. A capture/MIPI module 1344 includes a four-lane CSI-2 compliant transmit block 1346 and a four-lane CSI-2 receive module and hub.

An MCU island 1360 is provided as a secondary subsystem and handles operation of the integrated SoC 1300 when the other components are powered down to save energy. An MCU ARM processor 1362, such as one or more ARM R5F cores, operates as a master and is coupled to the high-speed interconnect 1308 through an isolation interface 1361. An MCU general purpose I/O (GPIO) block 1364 operates as a slave. MCU RAM 1366 is provided to act as local memory for the MCU ARM processor 1362. A CAN bus block 1368, an additional external communication interface, is connected to allow operation with a conventional CAN bus environment in a vehicle. An Ethernet MAC (media access control) block 1370 is provided for further connectivity. External memory, generally non-volatile memory (NVM) such as flash memory 104, is connected to the MCU ARM processor 1362 via an external memory interface 1369 to store instructions loaded into the various other memories for execution by the various appropriate processors. The MCU ARM processor 1362 operates as a safety processor, monitoring operations of the SoC 1300 to ensure proper operation of the SoC 1300.

It is understood that this is one example of an SoC provided for explanation and many other SoC examples are possible, with varying numbers of processors, DSPs, accelerators and the like.

Figure 15:
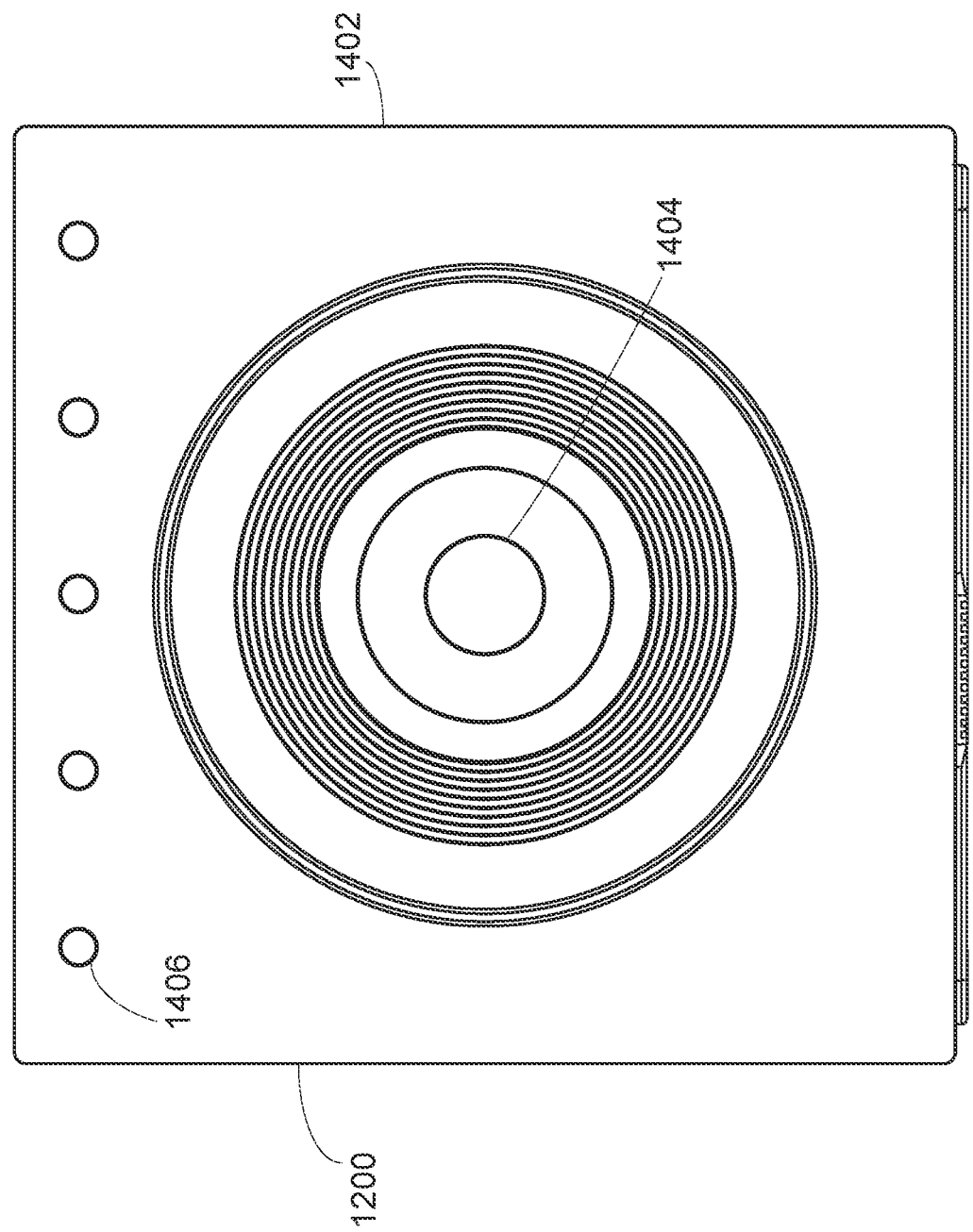
FIG. 15 is an illustration of the front view of a camera according to an example of this disclosure.

FIG. 15 provides a front view of a camera 1200, such as a camera 1116A, 1116B, 1116C. The camera 1200 is a housing 1402 with a lens 1404 provided in the center to operate with the imager 1216. A series of five openings 1406 are provided as ports to the microphones in the microphone array 1214. It is noted that the microphone openings 1406 form a horizontal line to provide the desired angular determination for the sound source localization algorithm. This is an exemplary illustration of a camera 1200 and numerous other configurations are possible, with varying lens and microphone configurations.

While the above description has used a conference room as the exemplary environment, the environment can be any setting where multiple cameras can provide different views of a group of individuals.

While the above description has used three cameras as an example, it is understood that different numbers of cameras can be utilized from two to a limit depending on the processing capabilities and the particular environment. For example, in a larger venue with more varied seating, more cameras may be necessary to cover all individuals that may speak.

While the above description had the camera selection being performed in a codec, it is understood that different items can perform the camera selection. In one example, one camera of the number of cameras can be selected to perform the camera selection and to interact with the other cameras to control the provision of video streams from the cameras. In another example, a separate video mixing unit can perform the camera selection and other video processing and the codec can simply encode the selected camera video stream.

By using SSL in combination with a neural network to determine locations of individuals in the field-of-view of the camera, the speaker from among a group of individuals is properly selected. Facial feature detection is performed on the selected individual in each camera. The detected facial features of each camera are compared to find the camera, if any, with the best view of the speaker. If there is at least a satisfactory view, the video stream from the selected camera is used to provide the video to the far end. If there is no satisfactory view, a default view is provided. The use of SSL and the bounding boxes allows positive identification of the speaker to allow facial analysis and view comparison of the proper individual. This allows the camera selection to be performed even when there are multiple individuals present in the field-of-view of the camera.

The various examples described are provided by way of illustration and should not be construed to limit the scope of the disclosure. Various modifications and changes can be made to the principles and examples described herein without departing from the scope of the disclosure and without departing from the claims which follow.

The invention claimed is:

1. A method for selecting a camera of a plurality of cameras, each with a different view of a group of individuals in an environment, to provide a video stream for provision to a far end, the method comprising:
for each camera of the plurality of cameras:
providing a video stream from the camera;
utilizing sound source localization using a microphone array on the camera to determine direction information;
identifying a speaker in the group of individuals using the sound source localization direction information and an image from the video stream;
identify facial features of the speaker in the image from the video stream; and
providing an output of the identified facial features; and
selecting a camera from the plurality of cameras to provide a video stream for provision to the far end based on comparison of the identified facial features output for each camera.

2. The method of claim 1, wherein selecting a camera from the plurality of cameras comprises:
selecting the camera providing best view of a face of the speaker when there is an acceptable view of the face of the speaker; and selecting a default camera when there is not an acceptable view of the face of the speaker or there is not a speaker.

3. The method of claim 1, wherein selecting a camera from the plurality of cameras comprises:
performing the selecting based on the identified facial features at a given time;
evaluating the video stream of the selected camera to determine if another selection may be necessary after performing the selection operations; and
repeating the performing the selection operations when it is determined that a selection may be necessary.

4. The method of claim 1, wherein the sound source localization is performed in each camera for that camera.

5. The method of claim 4, wherein the identifying a speaker and the identifying facial features is performed in each camera for that camera.

6. The method of claim 4, wherein the identifying a speaker and the identifying facial features is performed in a unit separate from each of the cameras.

7. The method of claim 1, further comprising providing audio from each microphone in the microphone array from each camera to a unit separate from each of the cameras,
wherein the sound source localization, the identifying a speaker and the identifying facial features for each camera is performed in the unit separate from each of the cameras.

8. A non-transitory processor readable memory containing programs that when executed cause a processor or processors to perform the following method of selecting a camera of a plurality of cameras, each with a different view of a group of individuals in an environment, to provide a video stream for provision to a far end, the method comprising:
for each camera of the plurality of cameras:
providing a video stream from the camera;
utilizing sound source localization using a microphone array on the camera to determine direction information;
identifying a speaker in the group of individuals using the sound source localization direction information and an image from the video stream;
identify facial features of the speaker in the image from the video stream; and
providing an output of the identified facial features; and
selecting a camera from the plurality of cameras to provide a video stream for provision to the far end based on comparison of the identified facial features output for each camera.

9. The non-transitory processor readable memory of claim 8, wherein selecting a camera from the plurality of cameras comprises:
selecting the camera providing a best view of a face of the speaker when there is an acceptable view of the face of the speaker; and
selecting a default camera when there is not an acceptable view of the face of the speaker or there is not a speaker.

10. The non-transitory processor readable memory of claim 8, wherein selecting a camera from the plurality of cameras comprises:
performing the selecting based on the identified facial features at a given time;
evaluating the video stream of the selected camera to determine if another selection may be necessary after performing the selection operations; and
repeating the performing the selection operations when it is determined that a selection may be necessary.

11. The non-transitory processor readable memory of claim 8, wherein the sound source localization is performed in each camera for that camera.

12. The non-transitory processor readable memory of claim 11, wherein the identifying a speaker and the identifying facial features is performed in each camera for that camera.

13. The non-transitory processor readable memory of claim 11, wherein the identifying a speaker and the identifying facial features is performed in a unit separate from each of the cameras.

14. The non-transitory processor readable memory of claim 8, the method further comprising providing audio from each microphone in the microphone array from each camera to a unit separate from each of the cameras,
wherein the sound source localization, the identifying a speaker and the identifying facial features for each camera is performed in the unit separate from each of the cameras.

15. A system for selecting a camera of a plurality of cameras, each with a different view of a group of individuals in an environment, to provide a video stream for provision to a far end, the system comprising:
a plurality of cameras, each camera including:
an imager;
a microphone array;
an output interface for providing data and a video stream;
RAM;
a processor coupled to the imager, the output interface, the microphone array and the RAM for executing programs; and
memory coupled to the processor for storing programs executed by the processor, the memory storing programs executed by the processor to perform the operations of:
providing a video stream from the camera; and
utilizing sound source localization using the microphone array to determine direction information and providing direction information; and
a codec coupled to the plurality of cameras, the codec including:
an input interface for coupling to the plurality of cameras to receive data and video streams;
a network interface for communicating with the far end;
RAM;
a processor coupled to the network interface, the input interface and the RAM for executing programs; and
memory coupled to the processor for storing programs executed by the processor, the memory storing programs executed by the processor to perform the operation of:
selecting a camera from the plurality of cameras to provide a video stream for provision to the far end based on comparison of identified facial features output for each camera,
wherein either the memory of each camera of the plurality of cameras stores programs executed by the processor to perform the operations of or the memory of the codec stores programs executed by the processor to perform for each camera of the plurality of cameras the operations of:
identifying a speaker in the group of individuals using the sound source localization direction information and an image from the video stream;

identify facial features of the speaker in the image from the video stream; and providing an output of the identified facial features.

16. The system of claim 15, wherein selecting a camera from the plurality of cameras comprises:

selecting the camera providing a best view of a face of the speaker when there is an acceptable view of the face of the speaker; and selecting a default camera when there is not an acceptable view of the face of the speaker or there is not a speaker.

17. The system of claim 15, wherein selecting a camera from the plurality of cameras comprises:

performing the selecting based on the identified facial features at a given time;

evaluating the video stream of the selected camera to determine if another selection may be necessary after performing the selection operations; and repeating the performing the selection operations when it is determined that a selection may be necessary.

18. The system of claim 15, wherein the memory of each camera of the plurality of cameras stores the programs executed by the processor to perform the operations of:

identifying a speaker in the group of individuals using the sound source localization direction information and an image from the video stream;

identify facial features of the speaker in the image from the video stream; and providing an output of the identified facial features.

19. The system of claim 15, wherein the memory of the codec stores programs executed by the processor to perform for each camera of the plurality of cameras the operations of:

identifying a speaker in the group of individuals using the sound source localization direction information and an image from the video stream;

identify facial features of the speaker in the image from the video stream; and providing an output of the identified facial features.

20. The system of claim 15, wherein at least one neural network is formed by the programs executed by the processor to perform the operations of:

identifying a speaker in the group of individuals using the sound source localization direction information and an image from the video stream; and identify facial features of the speaker in the image from the video stream.

\* \* \* \* \*